United States Patent [19]
Denz et al.

[11] Patent Number: 5,442,551
[45] Date of Patent: Aug. 15, 1995

[54] TANK-VENTING SYSTEM FOR A MOTOR VEHICLE AS WELL AS A METHOD AND AN ARRANGEMENT FOR CHECKING THE OPERABILITY THEREOF

[75] Inventors: Helmut Denz, Stuttgart; Ernst Wild, Oberriexingen; Andreas Blumenstock, Ludwigsburg, all of Germany

[73] Assignee: Robert Bosch GmbH, Stuttgart, Germany

[21] Appl. No.: 989,026
[22] PCT Filed: Jun. 19, 1992
[86] PCT No.: PCT/DE92/00504
  § 371 Date: Mar. 11, 1993
  § 102(e) Date: Mar. 11, 1993
[87] PCT Pub. No.: WO93/01405
  PCT Pub. Date: Jan. 21, 1993

[30] Foreign Application Priority Data
Jul. 11, 1991 [DE] Germany .......... 41 22 975.4

[51] Int. Cl.⁶ .......... F02M 33/02; G01M 15/00
[52] U.S. Cl. .......... 364/424.03; 364/431.05; 123/520; 123/198 D
[58] Field of Search .......... 364/424.03, 431.05, 364/431.06, 551.01, 558, 564, 571.01, 575; 123/520, 198 D, 698, 518, 519, 516; 73/117.3, 117.1, 118.1, 119 A; 60/307

[56] References Cited

U.S. PATENT DOCUMENTS

| | | | |
|---|---|---|---|
| 4,683,861 | 8/1987 | Breikreuz et al. | 123/520 |
| 4,794,790 | 1/1989 | Margarit-Metaxa et al. | 73/117.3 |
| 5,072,712 | 12/1991 | Steinbrenner et al. | 123/489 |
| 5,186,153 | 2/1993 | Steinbrenner et al. | 123/519 |
| 5,195,498 | 3/1993 | Sibbler et al. | 123/520 |
| 5,243,853 | 9/1993 | Steinbrenner et al. | 73/117.3 |
| 5,265,577 | 11/1993 | Denz et al. | 123/520 |

FOREIGN PATENT DOCUMENTS 4012111 7/1991 Germany .
4003751 8/1991 Germany .

Primary Examiner—Kevin J. Teska
Assistant Examiner—Tan Q. Nguyen
Attorney, Agent, or Firm—Walter Ottesen

[57] ABSTRACT

A method for determining the operability of a tank-venting system on a motor vehicle subjects the signals for the volume flow through the tank-venting valve and the signals for the pressure difference between the tank interior and the ambient to a cross-covariance analysis. The above-mentioned signals are formed by a high pass in advance of forming the cross-covariance function and the maximum or the mean value of the cross-covariance function is formed with respect to the product of the two input variables. A variance measure is formed for the signal of the volume flow through the tank-venting valve and a transfer factor is computed from the variance measure and the mean value or maximum. The tank-venting system is deemed to be operational when the transfer range lies in a pregiven region. An advantage of the method is seen in the independence of the tank-pressure changes which are not caused by volume-flow changes through the tank-venting valve. Here, changes are especially of concern which are caused by the sudden generation of vapor in the tank such as caused by sloshing fuel.

12 Claims, 3 Drawing Sheets

TANK-VENTING SYSTEM FOR A MOTOR VEHICLE AS WELL AS A METHOD AND AN ARRANGEMENT FOR CHECKING THE OPERABILITY THEREOF

FIELD OF THE INVENTION

The following relates to a tank-venting system for a motor vehicle as well as a method and an arrangement for checking the operability of such a system.

BACKGROUND OF THE INVENTION

A tank-venting system typically has the following components: a tank having a tank closure device; an adsorption filter with a venting line; a tank-venting valve; a tank connecting line between the tank and the adsorption filter; and, a valve line between-the adsorption filter and the tank-venting valve.

The tank-venting valve is connected to the intake pipe of an internal combustion engine so that fuel vapors are drawn out of the tank-venting system with the aid of the underpressure in the intake pipe. During this process, the adsorption filter is regenerated with the aid of air which is drawn in via the venting line.

There is the danger that tank-venting systems develop leaks or that obstructions arise. Such systems therefore have to be repeatedly checked as to operability during the operation of a motor vehicle.

The most important method for checking the operability of a motor vehicle tank-venting system is based on a proposal of the California Environmental Authority CARB. According to this method, when opening the tank-venting valve, a check is made as to whether a lambda controller has to carry out a correction of its control output. This is always the case when air with fuel vapor is evacuated by suction out of the tank-venting system. However, it is also the case that the adsorption filter is completely regenerated and that the fuel in the tank is completely evaporated. When the tank-venting valve is opened, no fuel is supplied in addition to that which is supplied to the injection valves of the internal combustion engine according to the control output of the lambda control. In such a case, in which therefore no fuel is supplied by the tank-venting system, that is, the lambda controller does not have to carry out a correction, it is unclear whether the tank-venting system has developed a leak or whether no fuel is being supplied because of the mentioned reasons. In order to be able to decide this question, according to the known method, an evaluation of the signal from the lambda controller only occurs when a fuel temperature sensor indicates that a predetermined minimum fuel temperature is exceeded and a tank fill-level sensor indicates that the vehicle tank has been filled. It is assumed that fuel vapor would then have to be present in the system in any event which vapor is drawn in when the tank-venting valve is opened and which then leads to a correction of the lambda controller. However, with this method incorrect decisions repeatedly occur if there is in fact evaporated fuel in the tank, refilling occurs with the same kind of fuel and the adsorption filter is largely regenerated.

A tank-venting system is described in U.S. Pat. No. 5,193,512 which includes a controllable shut-off valve in the venting line of the adsorption filter. This shut-off valve makes it possible to carry out a method wherein the shut-off valve is closed, the tank-venting valve is opened and then a check is made as to whether an underpressure is building up in the tank. If this is the case, it is concluded that the system is operable.

Erroneous decisions can be made in the above-mentioned method when the fuel vaporizes with great intensity. Furthermore, it is necessary to carry out a special test cycle with the shut-off valve closed wherein the adsorption filter cannot be regenerated.

Accordingly, the problem is presented to provide an especially reliable method for checking the operability of the tank-venting system for a motor vehicle as well as to provide an arrangement for carrying out such a method and a tank-venting system having an operability which can be checked both reliably and to a great extent.

SUMMARY OF THE INVENTION

The method of the invention for determining the operability of a tank-venting system of the kind described above is characterized by the following steps:

forming a first input variable for a cross-covariance analysis by a high-pass processing of the signal for the volume flow through the tank-Venting valve;

forming the second input variable for the cross-covariance analysis by a high-pass processing of the signal for the tank-pressure difference, that is, the difference between the pressure in the tank and the ambient pressure;

determining the maximum or mean value of the cross-covariance function concerning the product of the two input variables;

forming a measure for the variance of the first input variable;

computing a transfer factor by dividing the maximum or the mean value of the cross-covariance function by the above-mentioned measure for the variance of the first input variable; and, checking whether the transfer factor lies in a pre-given value range and, if so, determining the tank-venting apparatus as being operable, otherwise, as being inoperable.

The arrangement according to the invention includes a unit for each above-mentioned method step which unit is so configured that it carries out the particular method step.

The tank-venting system according to the invention includes the above-delineated features for a known tank-venting system and is characterized in that:

a venting throttle is provided on the adsorption filter;

the venting line of the adsorption filter leads up to the tank-closure unit and is mounted thereon so that the venting line is closed when the tank-closure unit is closed; and, an arrangement according to an embodiment of the invention is provided.

The method according to the invention utilizes the realization that changes in the volume flow through the tank-venting valve take place almost continuously during operation of a tank-venting system during the tank-venting phases. Tank pressure changes must correlate with these volume flows. On the other hand, tank-pressure changes can be caused by other effects, for example, by sloshing of the tank content when driving through a curve and by suddenly generated vapors caused thereby; however, these pressure changes do not correlate to the volume flow through the tank-venting valve. Accordingly, it must be determined whether tank-pressure changes are caused by volume-flow changes (which is an indicia for the operability of the system) by means of a cross-correlation analysis or, still better, by means of a cross-covariance analysis as in the invention.

To obtain input variables for the cross-covariance analysis, the signals for the volume flow and the tank-pressure difference, that is, the difference between the pressure in the tank and the ambient pressure, are each subjected to high-pass processing. This preferably takes place in that the mean value of the particular signal is formed and this mean value is subtracted from the particular instantaneous signal value. In this way, the input variables fluctuate about the particular mean value as is required for the input variables of a cross-covariance analysis.

The volume flow through the tank-venting valve can be measured directly; however, it is more advantageous to determine the volume flow with the aid of the following: the pressure difference present on the tank-venting valve, a pressure-difference volume-flow characteristic and the pulse-duty factor of the drive of the tank-venting valve. The pressure difference can either be measured or the pressure can be determined as the difference between the ambient pressure and the intake pressure which is, in turn, more advantageous. The intake pressure can either be measured or can preferably be determined from a load signal. The ambient pressure can be assumed, as a good approximation, to be constant; however, the ambient pressure can also be measured or be determined with the aid of substitute variables.

A product is formed from a pressure difference and a volume-flow difference when forming the cross-covariance and this product is integrated. Preferably, the integration is replaced by a low-pass filtering. The obtained value can be divided by the variance of the volume-flow difference, that is, by the integrated square or preferably by the low-pass filtered square of the volume-flow difference. If this is done, then as a transfer factor, a variable is obtained which expresses the extent to which the pressure in the tank changes with a change of the volume flow.

The value of the cross-covariance function relating to the product of the two input variables then becomes a maximum when values of both input variables are multiplied by that time-dependent shift which corresponds to the phase shift between the two signals. Thus, the particular instantaneous tank differential-pressure difference must be multiplied by a previous volume-flow difference. Previous values of this kind must be stored over a time range which lies between the minimum possible and the maximum possible phase shift.

If a fill-level sensor is provided in the tank, then the phase shift can be determined with the aid of a fill-level phase-shift characteristic. That volume-flow difference is selected from the stored volume-flow differences for multiplication with the instantaneous tank differential-pressure difference which just has the determined phase shift. If, in contrast, no fill-level sensor is provided, then it is advantageous to multiply all stored volume-flow differences by the particular instantaneous tank differential-pressure difference and to low-pass filter all products. The values obtained in this manner are representative of the cross-covariance function. The maximum value can easily be selected from these values.

It is apparent that the individual values of the cross-covariance function are not only dependent from the covariance between the two input variables but also from the absolute value of the variables. The absolute value of the tank differential-pressure difference is dependent on whether the tank-venting system leaks or is blocked. The entire cross-covariance function is affected thereby. This has the consequence that not only the maximum of the cross-covariance function can be used to form the transfer factor but also the mean value of the cross-covariance function. However, more precise results are provided by the maximum according to the theory of the cross-covariance analysis.

The result of he cross-covariance analysis becomes more precise, the broader in range the time-dependent changes of the volume flow through the tank-venting valve are. For cases where the volume-flow signal occurring during normal operation does not have an adequate frequency band width, it is advantageous to change the pulse-duty factor of the tank-venting valve arbitrarily. This can take place continuously or only then when the absolute mean value of the volume-flow differences drops below a threshold value which indicates that hardly any more changes occur with which changes in the tank differential pressure could be correlated. However, it is only purposeful to undertake these changes of the pulse-duty factor when the intake-pipe pressure is so low that the changes of the pulse-duty factor actually lead to volume-flow changes. Whether this is the case, can be decided either directly with the aid of the intake-pipe pressure or with the aid of a lower threshold value for the absolute mean value of the volume-flow difference.

It must be guaranteed that changes of the volume flow continue through the tank-venting valve into the tank as well as possible so that the method and the arrangement of the invention for determining the operability of a tank-venting system operate properly. This is the case, especially when the tank-venting valve is connected directly to the tank and the adsorption filter is only connected via a connecting line to the above-mentioned line. If in contrast, the tank-connecting line is introduced relatively far into the adsorption filter and if the adsorption filter is connected at its suction end separately to the tank-venting valve, it is possible that pressure changes on the suction end (caused by volume-flow changes) hardly affect the tank pressure. However, the measuring effect can be raised also in this case when a narrowly throttled venting line is used.

If a throttled venting line is used, then the problem arises, during tanking, in motor vehicles having internal fuel recovery that, during tanking, adequate air cannot escape through the venting line. In this case, it is advantageous if the adsorption filter has a venting line in addition to the venting throttle which can be opened during tanking but is closed during normal operation of the tank-venting system. In an especially advantageous manner, this venting line leads to the tank-closure unit and this closure unit is so configured that it closes the venting line in the closed state. In this way, it is automatically guaranteed that the venting line is opened when tanking. If the closure is no longer actuated after tanking, this has the consequence that the venting line remains open which, in turn, has the consequence that hardly any underpressure develops in the tank even for large volume flows through the tank-venting valve so that the cross-covariance analysis supplies very low transfer factors which indicate that the system leaks.

It is noted that all block function diagrams can be understood either as a block diagram for an arrangement or as a sequence diagram for a method.

DESCRIPTION OF THE PREFERRED EMBODIMENTS OF THE INVENTION

Figure 1:
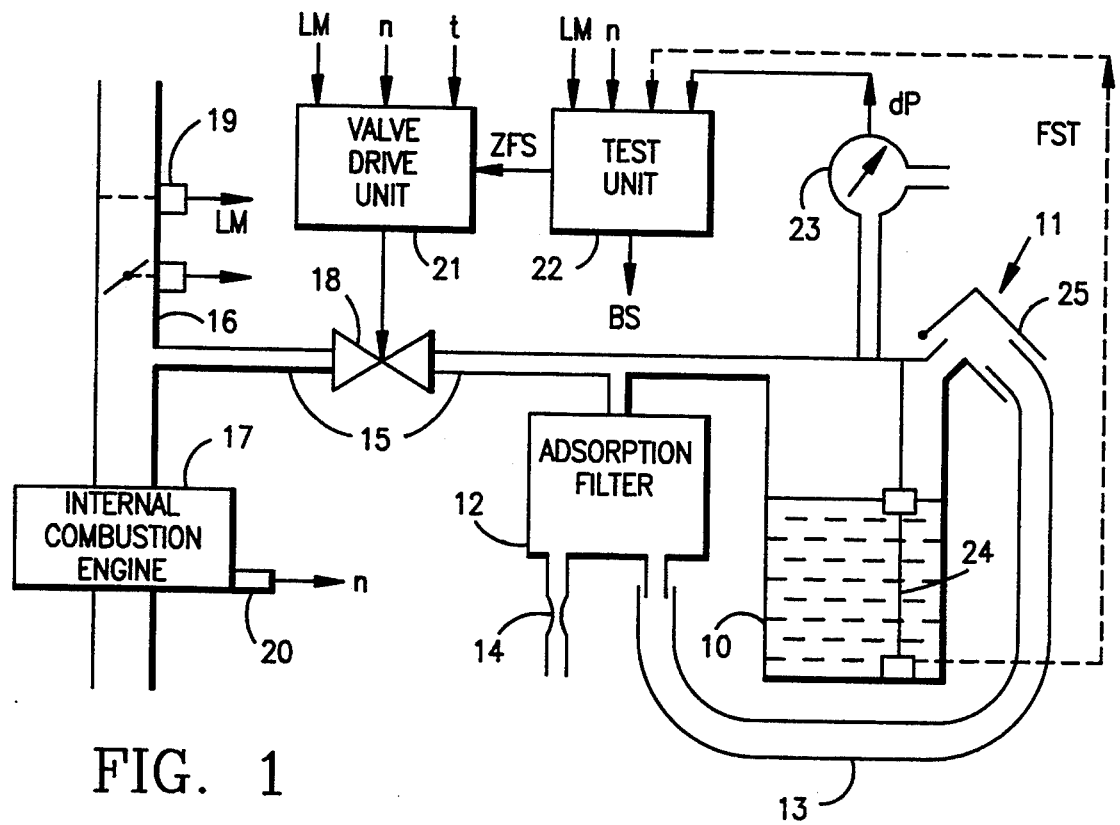
FIG. 1 is a schematic representation of a tank-venting system equipped with an arrangement for determining the operability of the System.

The illustration of FIG. 1 includes a tank-venting system having a tank 10 with a tank-closure unit 11, an adsorption filter 12 connected to the tank and having a venting line 13 and a venting throttle 14 as well as a venting line 15 to the intake pipe 16 of an internal combustion engine 17. A tank-venting valve 18 is inserted in the tank-venting line 15. A hot-wire air-mass sensor 19 is disposed in the intake pipe and emits an air-mass signal LM. A speed sensor 20 on the engine 17 determines the speed (n) thereof.

The tank-venting valve 18 is driven by a valve-control unit 21 having a pulse-duty factor which is dependent upon the time (t) and the load of the engine which is determined from the values LM and (n). The time dependence comprises that tank venting is permitted only during so-called tank-venting phases. Continuous tank venting is not permitted since the lambda control is affected by the tank venting. However, the lambda control must be adapted without the unknown influence of the tank venting. Typically, the adaptation phases and the tank-venting phases each take several minutes.

A test unit 22 is provided for checking the operability of the tank-venting system. The test unit 22 emits an evaluation signal BS which indicates the result of the check. The test unit 22 receives a differential-pressure signal dP from a differential-pressure sensor 23 mounted on the tank 10. The pressure sensor 23 measures the difference between the pressure in the tank and the ambient pressure. Furthermore, the test unit 22 receives a load signal for determining the pressure in the intake pipe 16. The load signal is here, in turn, represented by the values of the air mass LM and the speed (n) as well as selectively a fill-level signal FST from a fill-level sensor 24 in the tank.

Figure 2:
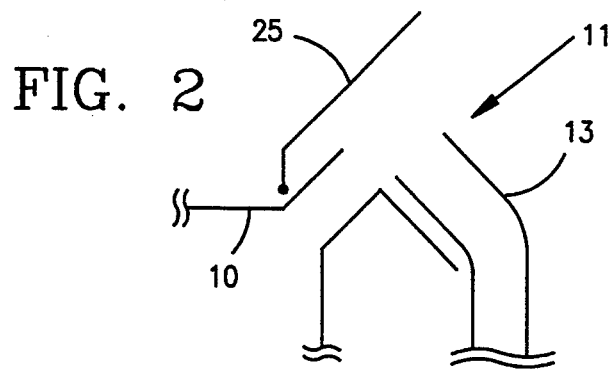
FIG. 2 is a schematic representation of a tank-closure unit with the tank closure open and on which the venting line for the adsorption filter shown in FIG. 1 ends.

From FIGS. 1 and 2 it is apparent that the venting line 13 is closed by the tank closure 25 as long as the cover itself is closed (FIG. 1). In contrast, this line is opened when the closure is opened (FIG. 2). The purpose of this arrangement is explained further below.

Figure 3:
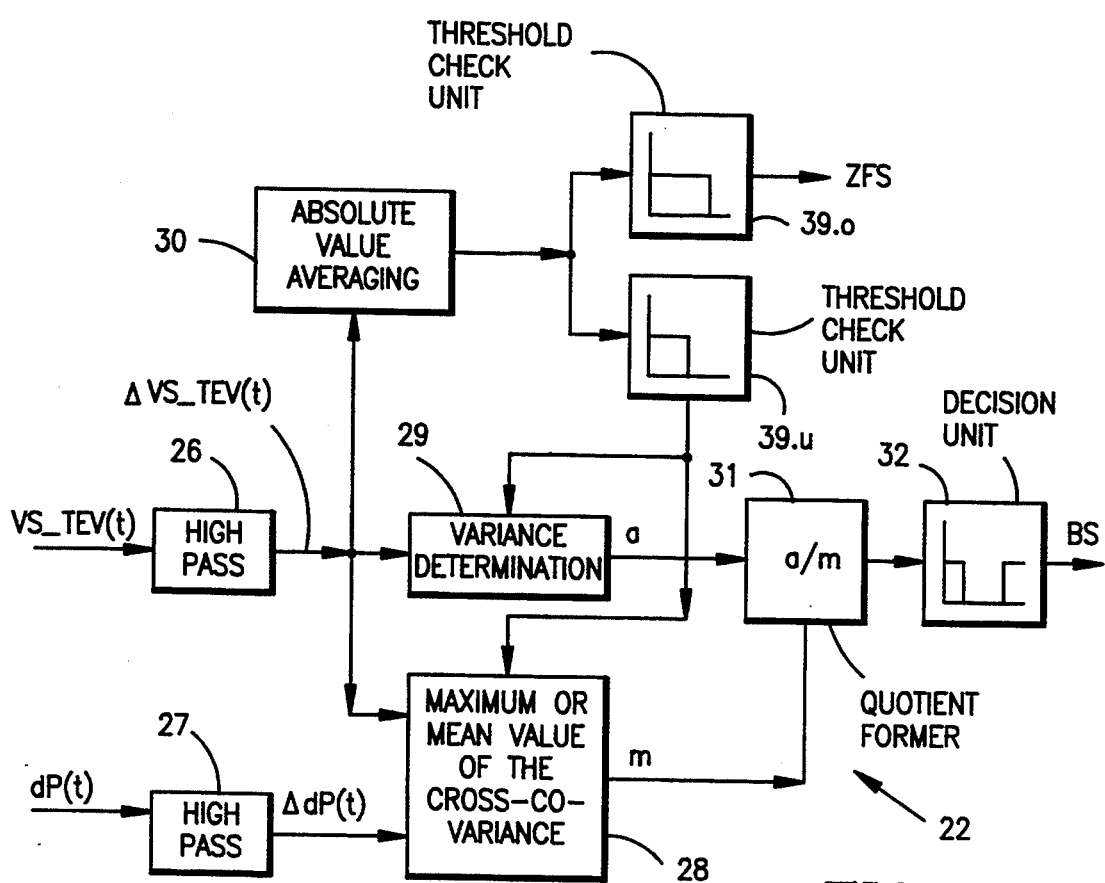
FIG. 3 is a block function diagram for the arrangement included in FIG. 1 for determining the operability of the tank-venting system.

The basic function of the test unit 22 will now be described on the basis of FIG. 3.

The signal VS_TEV(t) for the volume flow through the tank-venting valve 18 is subjected to high-pass processing in a first input-variable determination unit 26. The differential-pressure signal dP(t) from the differential-pressure sensor 23 is subjected to a corresponding high-pass processing in a second input variable determination unit 27. In this way, the input variables $\Delta VS\_TEV(t)$ and $\Delta dP(t)$ are obtained for a cross-covariance analysis which is carried out in a cross-covariance unit 28. The first input variable is further supplied to a variance-determination unit 29 as well as to a unit 30 for determining the mean of the absolute values of the first input variable. In a quotient former 31, the variance of the first input variable is divided by the maximum or the mean value of the cross-covariance function relating to the two input variables in the manner in which this mean value is emitted by the cross-covariance unit 28. The quotient obtained is compared to a lower and an upper threshold value for the quotient in a decision unit 32. If there is a drop below the lower threshold value or if the upper threshold value is exceeded, then the value "1" is emitted as the decision signal BS which indicates that the tank-venting system is not operational. Otherwise, the value "0" is emitted.

Figure 4:
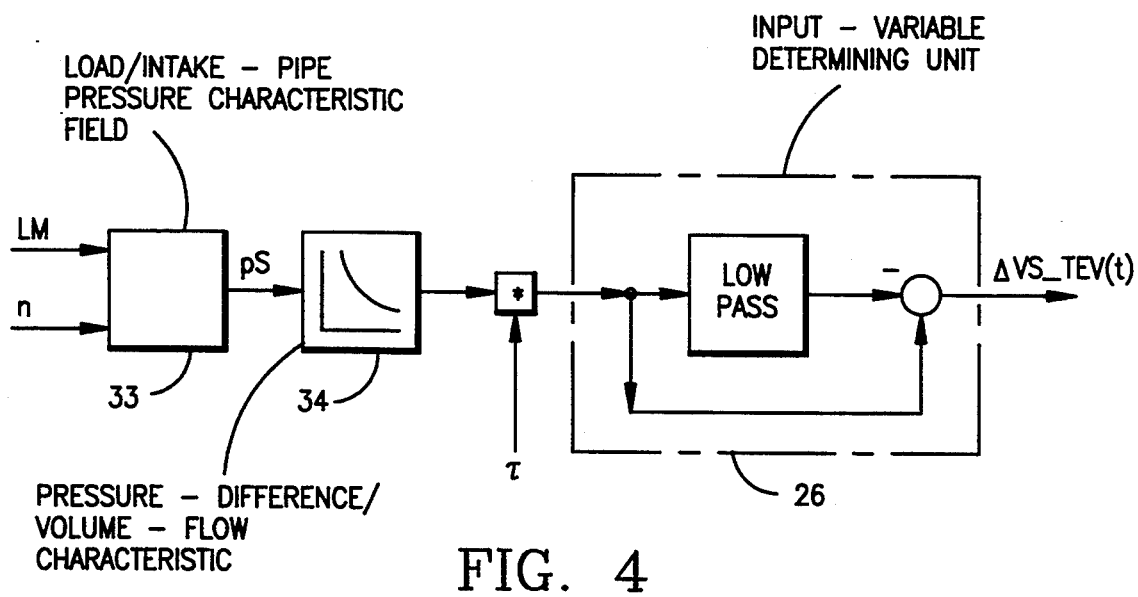
FIG. 4 is a block function diagram for explaining how the input variables are obtained for the cross-covariance analysis undertaken in the function sequence according to FIG. 3.

The mentioned high-pass processing of the signals VS_TEV(t) and dP(t) is now explained with respect to FIG. 4. There, only the first input-variable determining unit 26 is shown which operates as a high pass; however, the unit 27 for determining the second input variable operates in a corresponding manner. The volume-flow signal VS_TEV(t) is supplied to the first determination unit 26. This signal is averaged in a low pass and the volume-flow mean value is subtracted from the actual volume flow at an addition point whereby the volume-flow difference $\Delta VS\_TEV(t)$ is obtained as the first input variable.

The volume flow through the tank-venting valve 18 is determined in the embodiment as follows. The intake-pipe pressure pS is determined in dependence upon the load of the engine 17 from a load/intake-pipe pressure characteristic field 33. In the illustration of FIG. 4, values of the air-mass signal LM and the speed (n) are used as load information. The volume flow through the tank-venting valve is determined from the intake-pipe pressure with the aid of a pressure-difference/volume-flow characteristic 34 as the volume flow applies for a completely open valve and constant pressure on the end of the tank-venting valve facing toward the tank. The last condition is relatively well satisfied since the pressure on the above-mentioned end always corresponds essentially to the air pressure which is assumed in the embodiment to be constant. Finally, the volume flow determined in this manner is modified in a multiplication point by the pulse-duty factor $\tau$ of the tank-venting valve in order to obtain in this way the actual volume flow VS_TEV(t). This sequence can be simplified if either the intake-pipe pressure is measured or even if the volume flow through the tank-venting valve is determined directly by a through-flow sensor.

Figure 5:
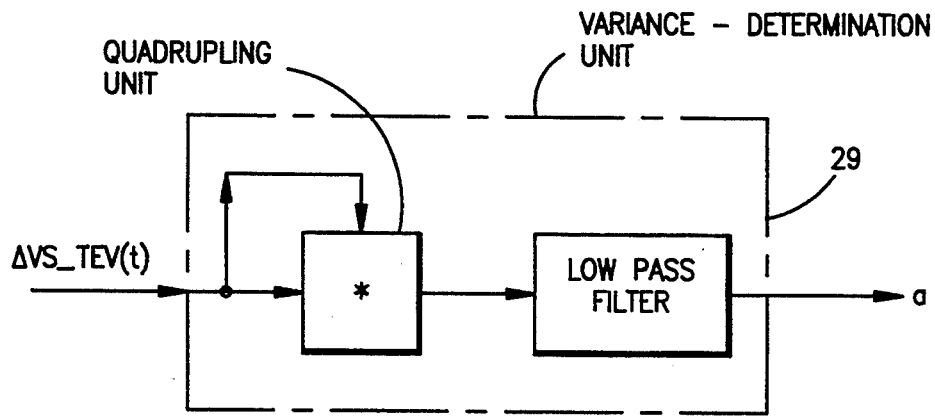
FIG. 5 explains a block function diagram as to how the variance of one of the input variables is determined.

FIG. 5 shows the typical operation of a variance determination. The input variable, which is here the volume-flow difference $\Delta VS\_TEV(t)$, is quadrupled and then integrated. In a preferred embodiment, a low-pass filtering through a low pass TP is undertaken in lieu of integration.

Figure 6:
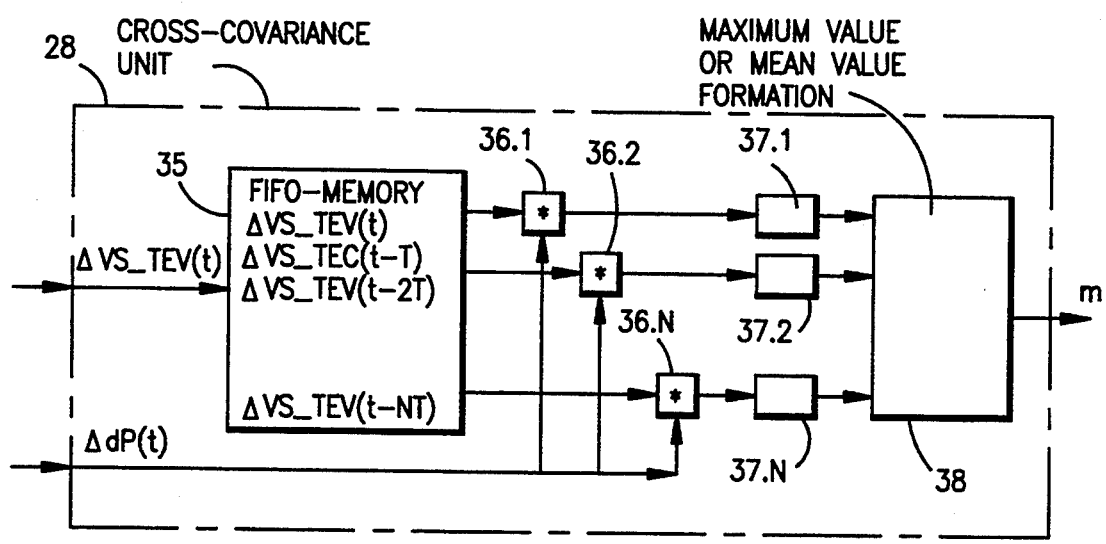
FIG. 6 is a block function diagram for explaining how the maximum value or mean value of a cross-covariance function is determined in the sequence according to FIG. 3.

The operation shown in FIG. 6 is that preferred as the operation of the cross-covariance unit 28. Alternatives are explained with respect to FIGS. 7 and 8.

According to FIG. 6, values for the volume-flow difference $\Delta VS\_TEV(t)$ are stored sequentially in a FIFO-memory 35 at pregiven time intervals T; that is, so many values are stored that the largest time shift N·T corresponds to the maximum possible phase shift between a change of the volume flow and a change of the tank differential pressure. The oldest value drops out of the memory with each newly received value. The stored values except for the most current one are all multiplied in multiplier points 36.1 to 36.n by the current tank differential-pressure difference $\Delta dP(t)$ as it is emitted from the first input-variable determination unit 27. The current volume-flow difference is not multiplied since, in the embodiment, the minimum possible mentioned phase difference is not zero; instead, it corresponds at least to the time span with which the sequentially following difference values are received in the memory. Each of the individual products is low-pass filtered in a downstream low-pass filter (TP) 37.1 to 37.N (ideally, an integration over the entire measuring time span should take place), whereby the individual values of a cross-covariance function are formed. From these values, the maximum value or the mean value is determined which takes place in a unit 38.

The time-dependent total sequence will be described before variations of the preferred embodiment are explained.

Measured values are formed every 30 msec for the output variables, that is, the volume flow $VS\_TEV(t)$ and the tank differential pressure dP(t). The described low-pass filtering takes place by means of a sliding mean-value formation pursuant to which the leading mean value is weighted by approximately 99%, preferably more and the new value is weighted with the remainder to 100%. This corresponds to a time constant of approximately 5 seconds. The volume-flow difference $\Delta VS\_TEV(t)$ formed in this manner is read into the FIFO-memory 35 every 500 msec. The FIFO-memory 35 holds a total of 30 values which means that the oldest value still held is 15 seconds old. This corresponds to a phase shift for the tank-venting system of the embodiment for a tank which is almost empty. For a full tank, the phase shift amounts to only approximately 500 msec. For all phase shifts, the cross-covariance to the tank differential-pressure difference $\Delta dP(t)$ is computed with the aid of the multiplication points 36.1 to 36.n and then low-pass filtered. This filtering takes place in the embodiment with a time constant of 6 minutes which means that for a computation every 500 msec, the value which is new each time is only considered with approximately 1% in proportion to the old mean value. The low-pass filtered value which is the greatest is dependent upon the fill level of the tank at the particular time.

The sliding mean-value formation in the low pass takes place in the variance-determination unit 29 with a time constant of likewise 6 minutes. If the value determined in this manner is divided by the output variable of the cross-covariance unit 28, then a transfer factor results which indicates how large the tank differential-pressure changes must be for pregiven volume-flow changes. The transfer factor for a properly operating tank-venting system can be determined by experiments. A bottom threshold value lying somewhat lower and an upper threshold value lying somewhat higher are determined with the aid of the transfer factor determined in this manner. If there is a drop below the lower threshold value, this indicates that the tank,venting system is not operational because of a leak. If the upper threshold value is exceeded, this indicates inoperability because of a blockage of the adsorption filter. In this case, the pressure changes in the tank for volume-flow changes through the tank-venting valve are greater than they should actually be.

Cross-covariances can only then be purposefully formed when volume-flow changes are present which can cause pressure changes in the tank. If the volume-flow changes are too small, it is therefore advantageous to delay the evaluation described below. For this purpose, the output signal of the absolute value averaging 30 is supplied to a first threshold check unit 39.u which checks whether the mean value of the absolute values of the volume-flow changes has dropped below a lower threshold value. If this is the case, then a signal is emitted to the variance-determination unit 29 and the cross-correlation unit 28 to maintain the particular last value.

In the last case, the method for determining the operability of the tank-venting system must be delayed. In order to possibly avoid this last case, the output signal of the absolute mean value averaging 30 is supplied to a second threshold check unit 39.o. The unit 39.o emits a signal ZFS for generating an arbitrary pulse-duty factor $\tau$ to the valve-control unit 21 as soon as there is a drop below the above-mentioned threshold value. However, the valve-control unit 21 generates this arbitrary pulse-duty factor only when this unit determines with the aid of the load signal that this pulse-duty factor has a purpose because of an adequately low intake-pipe pressure and if the unit furthermore determines from the operating-condition data of the engine 17 that the engine runs in an operating range wherein continuous changes of the pulse-duty factor do not constitute a disturbance.

An arbitrary pulse-duty factor can basically always be adjusted as long as an operating range of the engine is present wherein the changes of the pulse-duty factor do not constitute a disturbance. This is done in order not only to obtain a volume-flow change signal having the greatest possible band width for the above-mentioned conditions but also in order to have one such signal always present. However, care must be taken that the time-dependent mean value of the pulse-duty factor corresponds approximately to that pulse-duty factor which would be adjusted for conventional operation of the valve-control unit in the particular operating state.

Figure 7:
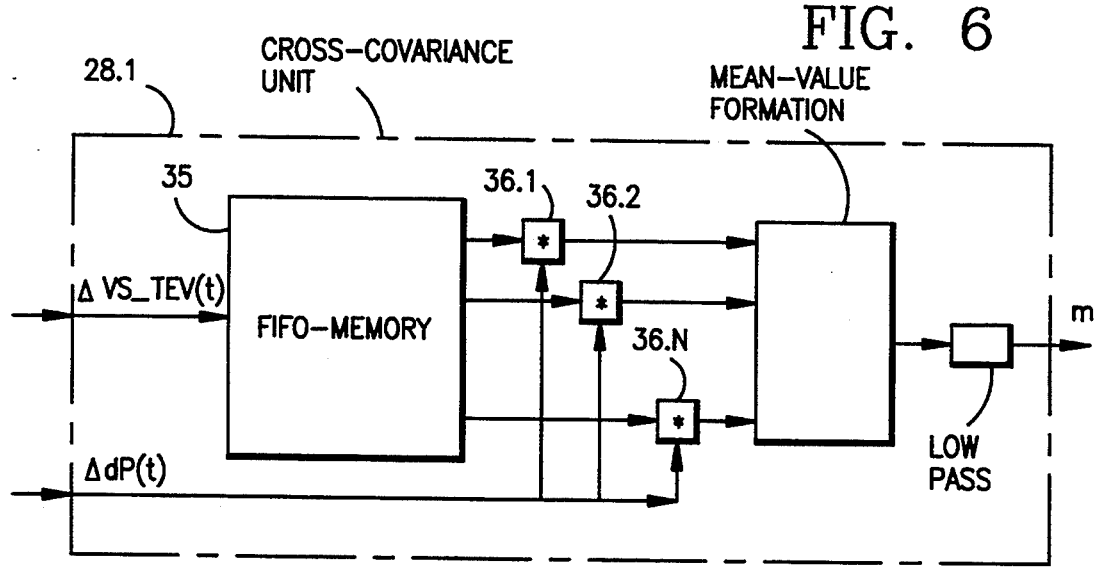
FIG. 7 is a block function diagram corresponding to that of FIG. 6 but for another variant to determine a mean value in connection with a cross-covariance analysis; and, FIG. 8 is a block function diagram corresponding to that of FIG. 6 but for another variant for determining the maximum value of the cross-covariance function.

A simplification of the embodiment of FIG. 6 is explained with reference to FIG. 7. According to FIG. 7, a mean-value formation and then a low-pass filtering of this mean value takes place directly after the formation of the products in the multiplication points 36.1 to 36.n. This is in lieu of first low-pass filtering the product and then determining the mean value. In this way, all low-pass filters except for one are made unnecessary. The output signal obtained in this manner from the cross-covariance unit 28.1 according to FIG. 7 is however less reliable than that from the cross-covariance unit 28 according to FIG. 6 since the correct determination of the cross-covariance function first requires the low-pass filtering.

Figure 8:
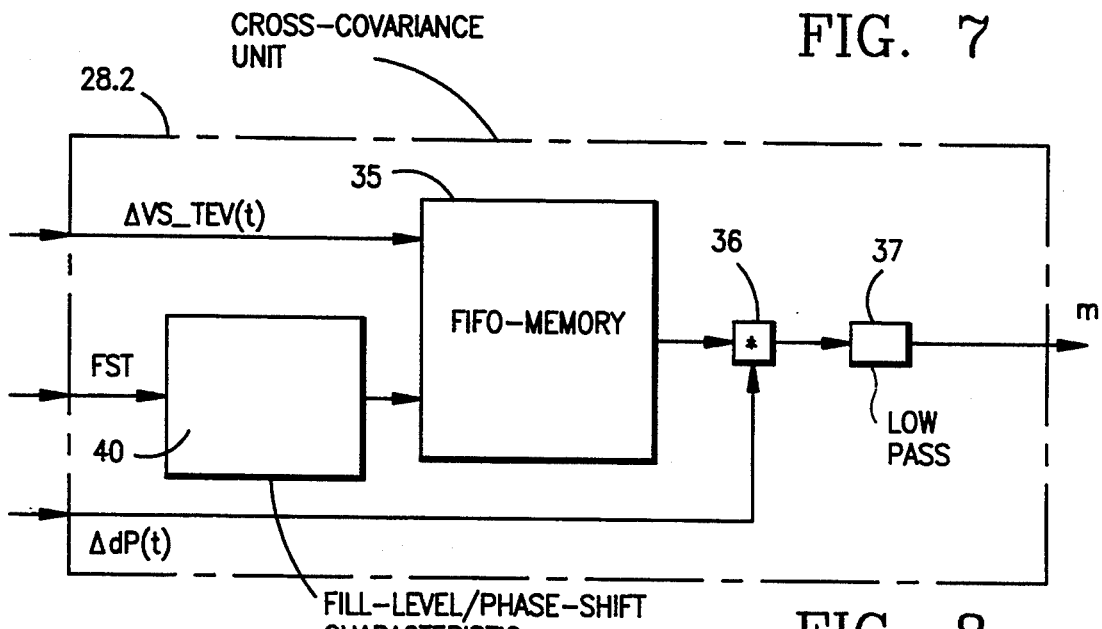

The cross-covariance unit 28.2 according to FIG. 8 operates with the same reliability as the cross-covariance unit 28 according to FIG. 6. However, the cross-covariance unit 28.2 operates with less computation complexity but requires a level sensor 24. The cross-covariance unit 28.2 also has the FIFO-memory 35 described with respect to FIG. 6. However, only the value for multiplication by the tank differential-pressure difference ΔdP(t) is read out from the FIFO-memory 35 and this value has precisely the actual phase shift to the above-mentioned pressure difference. This phase shift is obtained with the aid of a fill-level/phase-shift characteristic 40 which emits the corresponding phase shift between volume-flow change and tank-pressure change for every filling level of the tank. The read out value is filtered in a single low pass 37 after the above-mentioned multiplication. Accordingly, the multiplier points except for one, the low-pass filters except for one and the determination unit 38 for the maximum value of the cross-correlation function are unnecessary.

We claim:

1. A method for determining operability of a tank-venting system on a motor vehicle having an internal combustion engine, the tank-venting system having an adsorption filter which is connected via a tank-connecting line to a tank and via a valve line to an intake pipe of the engine with a tank-venting valve connected therebetween through which a volume flow passes, the method comprising the steps of:

providing a cross-covariance unit defining a cross-covariance function for carrying out a cross-covariance analysis therein;

measuring the volume flow through said tank-venting valve and providing a signal indicative of said volume flow;

forming a first input variable for said cross-covariance analysis by high-pass processing said signal for the volume flow through the tank-venting valve;

measuring the difference pressure between the pressure in the tank and the ambient pressure and providing a signal indicative of said difference pressure;

forming a second input variable for the cross-covariance analysis by high-pass processing said signal for said difference pressure between the pressure in the tank and the ambient pressure;

determining one of the maximum value and the mean value of the cross-covariance function with respect to the product of the two input variables;

providing a variance-determination unit;

applying said first input variable to said variance-determination unit to obtain a measure of the variance of the first input variable;

computing a transfer factor by dividing said one of the maximum value and said mean value of the cross-covariance function by said measure for the variance of the first input variable; and, checking whether the transfer factor lies in a pregiven value range and if this is the case, determining the tank-venting system as being operational, otherwise, as being non-operational.

2. The method of claim 1, wherein the maximum of the cross-covariance function is determined by the further method steps of:

sequentially storing a plurality of values of said first input variable at pregiven time intervals with a first one of the stored values corresponding to the smallest shift in phase between a change of said volume flow and a change in said difference pressure to a last one of said stored values corresponding to the maximum possible shift in phase between a change of said volume flow and a change of said difference pressure;

multiplying each of the stored values except for the most recent one by successive values of said second input variable to form a plurality of individual products;

computing said cross-covariance for each of said shifts in phase; and, selecting the cross-variance function having the largest positive value.

3. The method of claim 1, wherein the maximum of the cross-covariance function is determined by the further method steps of:

determining the level of the tank;

determining a phase shift to be expected between the first and the second input variables;

multiplying the actual value of the second input variable by the value of the first input variable time delayed by the determined phase shift; and, averaging the multiplication result.

4. The method of claim 1, wherein the mean value of the cross-covariance function is determined by the further method steps of:

continuously computing a plurality of products from the actual value of the second input variable and a time-displaced value of the first input variable with the values of the first input variable extending from that value having the smallest possible phase shift with respect to the first input variable up to the value having the largest possible phase shift;

computing the cross-covariance factor for each phase shift considered; and, computing the mean value of the cross-covariance factors.

5. The method of claim 1, wherein the mean value of the cross-covariance function is determined by the further method steps of:

continuously computing a plurality of products from the actual value of the second input variable and a time-shifted value of the first input variable with the values of the first input variable extending from that value having the smallest possible phase shift with respect to the first input variable up to that value having the largest possible phase shift;

summing all products; and, averaging the product sum.

6. The method of claim 1, wherein the high-pass processing for the volume flow takes place by the further method steps of:

applying said signal indicative of said volume flow to a high-pass filter to form a volume-flow mean value; and, computing the volume-flow difference between the actual volume flow and the volume-flow mean value.

7. The method of claim 6, wherein the high-pass processing for the tank differential pressure takes place by the further method steps of:

applying said signal indicative of said difference pressure to form a mean value for the tank differential pressure; and, computing the tank differential-pressure difference between actual tank differential pressure and tank differential pressure mean value.

8. The method of claim 7, wherein the tank-venting valve is driven by a valve drive unit at a pulse-duty factor; and wherein the method comprises the further steps of:

applying said first input variable to an absolute value averaging unit to obtain an absolute value signal;

applying said absolute value signal to a threshold unit to obtain a random function signal; and, applying said random function signal to said valve drive unit to adjust the pulse-duty factor of the tank-venting valve.

9. The method of claim 8, wherein the pulse-duty factor of the tank-venting valve is only adjusted by said random function signal after satisfying the following conditions:

the intake-pipe pressure lies below a pressure threshold;

the value-flow mean value falls below an upper mean-value threshold; and, the engine operates in an operating region wherein continuous changes of the pulse-duty factor do not cause electrical disturbance.

10. The method of claim 9, wherein all method sequences are delayed in such time frames wherein the value-flow mean value drops below a lower mean-value threshold.

11. An arrangement for determining operability of a tank-venting system on a motor vehicle having an internal combustion engine, the tank-venting system having an adsorption filter which is connected via a tank-connecting line to a tank and via a valve line to an intake pipe of the engine with a tank-venting valve being connected therebetween through which a volume flow passes, the arrangement comprising:

means for measuring said volume flow through said tank-venting valve and providing a signal indicative of said volume flow;

first input-value determination means for high-pass processing the signal for the volume flow through the tank-venting valve for determining a first input variable;

means for measuring the difference pressure between the pressure in the tank and the ambient pressure and providing a signal indicative of said difference pressure;

second input-variable determination means for high-pass processing the signal for said difference pressure between the pressure in the tank and the ambient pressure for determining a second input variable;

cross-covariance means defining a cross-variance function for determining one of the maximum value and the mean value of the cross-covariance function relating to the product of said two input variables;

variance-determination means for forming a measure for the variance of the first input variable;

quotient former means for computing a transfer factor by dividing said one of the maximum value and the mean value of the cross-covariance function by said measure for the variance of the first input variable; and, decision means for determining whether the transfer factor lies in a pregiven value range and for determining the tank-venting system as being operational if this is the case, otherwise determining the system as being non-operational.

12. A combination of a tank-venting system in a motor vehicle equipped with an internal combustion engine having an intake pipe and an arrangement for determining operability of said tank-venting system, the combination comprising:

a tank-venting system including: a tank having a tank-closure unit; an adsorption filter having a venting line; a tank-venting valve through which a volume flow passes; a tank-connecting line between said tank and said adsorption filter; a first valve line interconnecting said adsorption filter and said tank-venting valve; a second valve line interconnecting said tank-venting valve and said intake pipe; a venting throttle arranged on said adsorption filter; a venting line interconnecting said adsorption filter and said tank-closure unit; and, said venting line being mounted on said tank-closure unit so that the venting line is closed in the closed state of the tank-closure unit; and, said arrangement including: means for measuring said volume flow through said tank-venting valve and providing a signal indicative of said volume flow; first input-value determination means for high-pass processing the signal for the volume flow through the tank-venting valve for determining a first input variable; means for measuring the difference pressure between the pressure in the tank and the ambient pressure and providing a signal indicative of said difference pressure;second input-variable determination means for high-pass processing the signal for said difference pressure between the pressure in the tank and the ambient pressure and for determining a second input variable; cross-covariance means defining a cross-covariance function for determining one of the maximum value and the mean value of the cross-covariance function relating to the product of said two input variables; variance-determination means for forming a measure for the variance of the first input variable; quotient former means for computing a transfer factor by dividing said one of the maximum value and the mean value of the cross-covariance function by said measure for the variance of the first input variable; and, decision means for determining whether the transfer factor lies in a pregiven value range and for determining the tank-venting system as being operational if this is the case, otherwise determining the system as being non-operational.

* * * * *